(12) United States Patent
Foo et al.

(10) Patent No.: US 7,544,924 B2
(45) Date of Patent: Jun. 9, 2009

(54) DIRECTIONAL INPUT DEVICE WITH A LIGHT DIRECTING SHAFT

(75) Inventors: Siang Leong Foo, Penang (MY); Boon Keat Tan, Penang (MY); Yee Loong Chin, Perak (MY)

(73) Assignee: Avago Technologies ECBU IP (Singapore) Pte. Ltd., Singapore (SG)

(*) Notice: Subject to any disclaimer, the term of this patent is extended or adjusted under 35 U.S.C. 154(b) by 112 days.

(21) Appl. No.: 11/356,477

(22) Filed: Feb. 17, 2006

(65) Prior Publication Data

US 2007/0194215 A1 Aug. 23, 2007

(51) Int. Cl.
*G06M 7/00* (2006.01)
(52) U.S. Cl. .............. 250/221; 250/208.6; 341/31; 356/152.2; 700/85; 345/161; 345/166
(58) Field of Classification Search ............ 341/31; 250/221, 208.6; 356/152.2; 700/85; 345/161, 345/166
See application file for complete search history.

(56) References Cited

U.S. PATENT DOCUMENTS

| 4,459,022 | A | * | 7/1984 | Morey ............... 356/152.2 |
| 4,686,361 | A | * | 8/1987 | Bard .................. 250/221 |
| 5,065,146 | A | * | 11/1991 | Garrett .............. 345/161 |
| 5,530,576 | A | * | 6/1996 | Jackson et al. ........ 250/229 |
| 5,943,233 | A | * | 8/1999 | Ebina et al. ............ 700/85 |
| 2002/0134925 | A1 | * | 9/2002 | Grenlund ........... 250/227.14 |
| 2003/0193415 | A1 | * | 10/2003 | Fo et al. ............... 341/20 |
| 2005/0162389 | A1 | * | 7/2005 | Obermeyer et al. ..... 345/161 |
| 2005/0163509 | A1 | * | 7/2005 | Kobayashi et al. ...... 398/132 |

* cited by examiner

*Primary Examiner*—Seung C Sohn

(57) ABSTRACT

A directional input device with a light directing shaft that avoids wear and tear caused by physical contact between a shaft and a sensor surface. A directional input device according to the present teachings includes a light emitter and a shaft having a surface that reflects light from the light emitter. A directional input device according to the present teachings further includes a set of light sensing elements that are positioned to detect a position of the shaft by sensing light reflected from the shaft.

19 Claims, 4 Drawing Sheets

DIRECTIONAL INPUT DEVICE WITH A LIGHT DIRECTING SHAFT

BACKGROUND

Directional input devices may be employed in a variety of systems including computer systems, game systems, simulators, specialized vehicles, controllers, and remote control applications, to name a few examples. Examples of directional input devices include joysticks and joypads.

A directional input device may include a shaft that may be manipulated by a user. A movement of a shaft may be used to provide a directional input for a computer system, game console, controller, etc. For example, a shaft of a directional input device may be moved to the left to indicate a "left" input. Similarly, a shaft of a directional input device may be moved to the right, up, or down, to provide corresponding directional inputs.

A directional input device may include a sensor surface for sensing the movements of its shaft. For example, a sensor surface may include a set of structures that make physical contact with a shaft and form electrical circuits that indicate the up, down, left, right, etc., positions of the shaft. Unfortunately, the cumulative effects of physical contact between a moving shaft and a sensor surface may cause wear and tear in the structures on the sensor surface and the shaft. The wear and tear of a sensor surface and a shaft may cause failures when detecting movements of a shaft with consequential failures in detecting directional inputs from a user.

SUMMARY OF THE INVENTION

A directional input device with a light directing shaft is disclosed that avoids wear and tear caused by physical contact between a shaft and a sensor surface. A directional input device according to the present teachings includes a light emitter and a shaft having a surface that reflects light from the light emitter. A directional input device according to the present teachings further includes a set of light sensing elements that are positioned to detect a position of the shaft by sensing light reflected from the shaft.

Other features and advantages of the present invention will be apparent from the detailed description that follows.

BRIEF DESCRIPTION OF THE DRAWINGS

The present invention is described with respect to particular exemplary embodiments thereof and reference is accordingly made to the drawings in which.

DETAILED DESCRIPTION

Figure 1A:
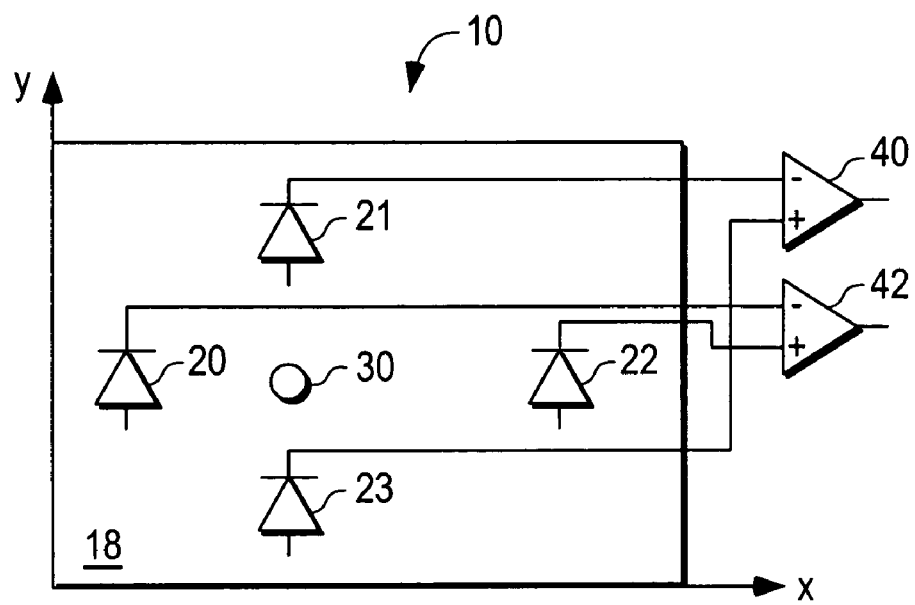
FIGS. 1a-1b show a top view and a side view, respectively, of a directional input device according to the present teachings.
Figure 1B:
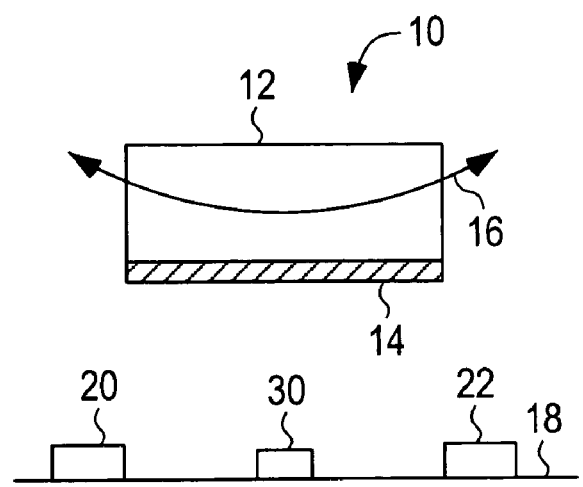

FIGS. 1a-1b show a top view and a side view, respectively, of a directional input device 10 according to the present teachings. The directional input device 10 includes a shaft 12 having a reflecting surface 14, e.g. a reflective coating, that enables the shaft 12 to direct light emitted from a light emitter 30 back onto a sensor surface 18 in response to manipulation of the shaft 12 by a user.

The sensor surface 18 includes a set of light sensing elements 20-23, e.g. photodiodes. The light sensing elements 20-23 are placed at selected positions with respect to a set of x-y axes of the sensor surface 18. The positions of the light sensing elements 20-23 are selected to detect movements of the shaft 12 with respect to the x-y axes by detecting light from the light emitter 30 that is reflected by the reflecting surface 14.

A tilting movement of the shaft 12, e.g. a tilting movement indicated by an arrow 16, causes reflected light from the light emitter 30 to illuminate one of the light sensing elements 20-23 depending on the movement of the shaft 12. A pair of amplifiers 40-42 detect which of the light sensing elements 20-23 is illuminated by detecting the high or low signal states of the light sensing elements 20-23.

Figure 2:
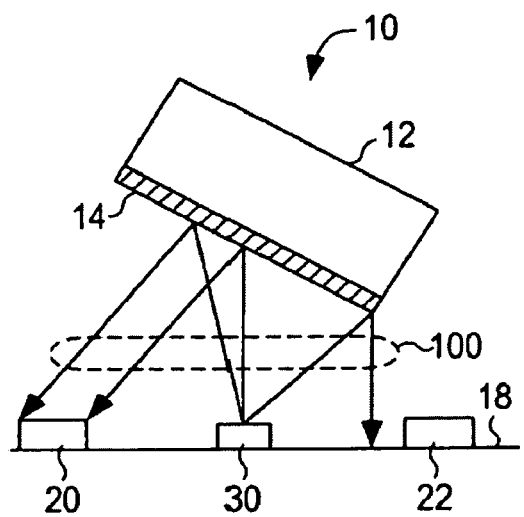
FIG. 2 shows light rays reflected from a reflecting surface of a shaft according to the present teachings.

FIG. 2 shows an example set of light rays 100 that depict light reflected from the reflecting surface 14 of the shaft 12 when the shaft 12 is rotated to the right, i.e. the +X direction. In the +X position of the shaft 12, the light sensing element 20 is illuminated with reflected light from the light emitter 30. As a consequence, the light sensing element 20 functions as a +X sensor, e.g. for a "Right" movement of a joypad or joystick.

Similarly, the light sensing element 22 functions as a −X sensor, e.g. for a "Left" movement of a joypad or joystick, because it is illuminated when the shaft 12 is moved to the left. Likewise, the light sensing elements 21 and 23 function as −Y (Down) and +Y (Up) sensors for movements of the shaft 12.

Table 1 summarizes the signal states of the light sensing elements 20-23 in response to a set of predetermined positions of the shaft 12.

TABLE 1

| +X | −X | +Y | −Y | Position |
|---|---|---|---|---|
| Low | Low | Low | Low | Center (Home) |
| High | Low | Low | Low | Right |
| Low | High | Low | Low | Left |
| Low | Low | High | Low | Up |
| Low | Low | Low | High | Down |
| High | Low | High | Low | Upper Right |
| High | Low | Low | High | Lower Right |
| Low | High | High | Low | Upper Left |
| Low | High | Low | High | Lower Left |

Figure 3:
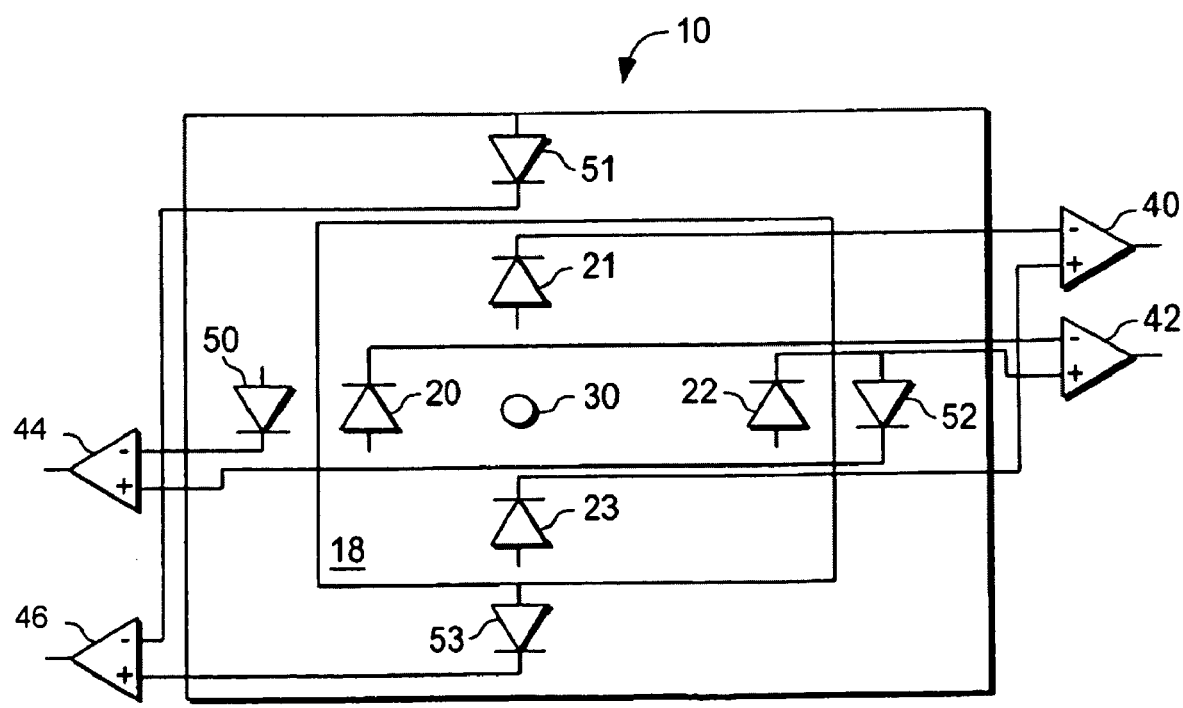
FIG. 3 shows a top view of another embodiment of a directional input device according to the present teachings.

FIG. 3 shows a top view of another embodiment of the directional input device 10. In this embodiment, the sensor surface 18 includes the light sensing elements 20-23 as an inner set of light sensors and further includes a set of light sensing elements 50-53 as an outer set of light sensors. The light sensing elements 50-53 are placed at selected positions with respect to the x-y axes of the sensor surface 18 to detect far movements of the shaft 12, e.g. for an acceleration function of the directional input device 10. A pair of amplifiers 44 and 46 detect which of the light sensing elements 50-53 is illuminated.

For example, a movement of the shaft 12 to the far right, i.e. the far +X direction, illuminates the light sensing element 50. As a consequence, the light sensing element 50 functions as a Far +X sensor (e.g. Accelerate Right). Similarly, the light sensing element 52 functions as a Far −X sensor (e.g. Accelerate Left) because it is illuminated when the shaft 12 is moved to the far left. Likewise, the light sensing elements 51 and 53 function as Far −Y (e.g. Accelerate Down) and Far +Y (e.g. Accelerate Up).

Table 2 summarizes the signal states of the light sensing elements 20-23 and 50-53 in response to a set of predetermined positions of the shaft 12.

length. Therefore, the strength of the sensor signals from the light sensing elements 80-87 in this embodiment indicate the relative of movement of the shaft 12 with respect to the length of the corresponding aperture 90-97 and may be used, for example, as an accelerate function of the directional input device 10.

TABLE 2

| Far +X | Far −X | Far +Y | Far −Y | Near +X | Near −X | Near +Y | Near −Y | Position |
|---|---|---|---|---|---|---|---|---|
| Low | Low | Low | Low | Low | Low | Low | Low | Center (Home) |
| Low | Low | Low | Low | High | Low | Low | Low | Right |
| Low | Low | Low | Low | Low | High | Low | Low | Left |
| Low | Low | Low | Low | Low | Low | High | Low | Up |
| Low | Low | Low | Low | Low | Low | Low | High | Down |
| Low | Low | Low | Low | High | Low | High | Low | Upper Right |
| Low | Low | Low | Low | High | Low | Low | High | Lower Right |
| Low | Low | Low | Low | Low | High | High | Low | Upper Left |
| Low | Low | Low | Low | Low | High | Low | High | Lower Left |
| High | Low | Low | Low | High | Low | Low | Low | Accelerate Right |
| Low | High | Low | Low | Low | High | Low | Low | Accelerate Left |
| Low | Low | High | Low | Low | Low | High | Low | Accelerate Up |
| Low | Low | Low | High | Low | Low | Low | High | Accelerate Down |
| High | Low | High | Low | High | Low | High | Low | Accelerate Upper Right |
| High | Low | Low | High | High | Low | Low | High | Accelerate Lower Right |
| Low | High | High | Low | Low | High | High | Low | Accelerate Upper Left |
| Low | High | Low | High | Low | High | Low | High | Accelerate Lower Left |

Figure 4:
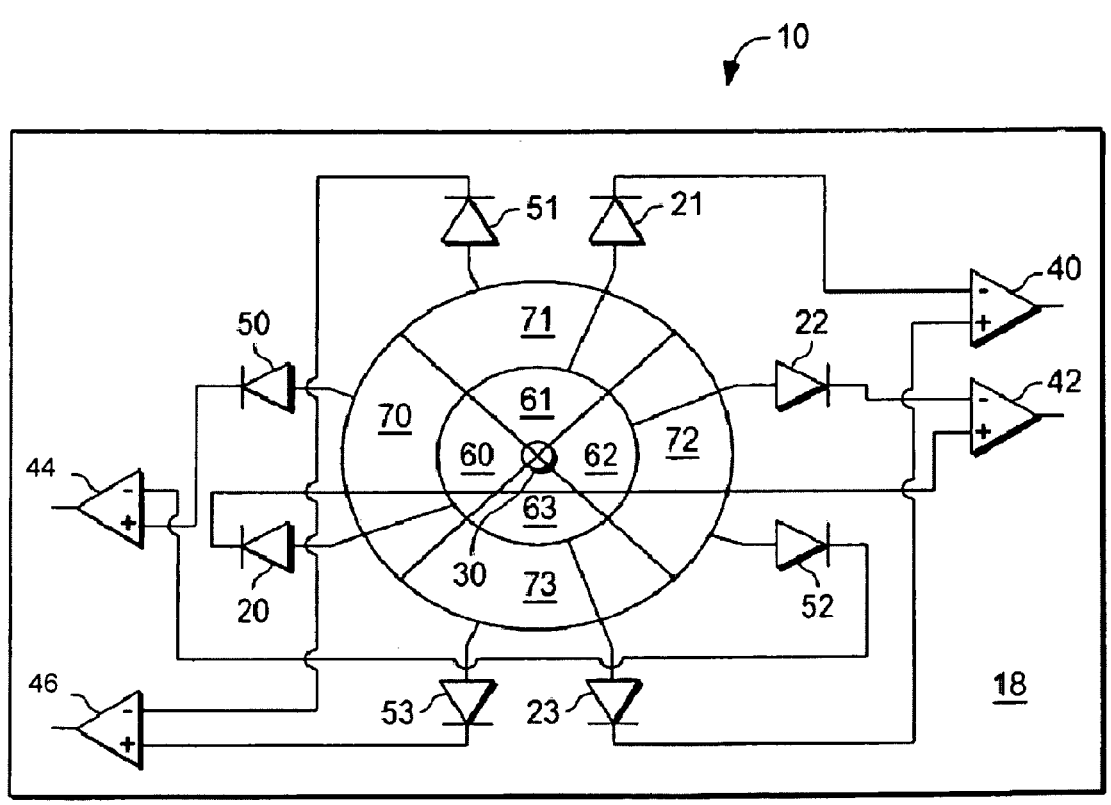
FIG. 4 shows a top view of yet another embodiment of a directional input device according to the present teachings.

FIG. 4 shows a top view of yet another embodiment of the directional input device 10. In this embodiment, the light sensing elements 20-23 and 50-53 have respective apertures 60-63 and 70-73 for receiving light reflected from the light emitter 30. Each aperture 60-63 and 70-73 has a pie shape. The apertures 60-63 form an inner circular light collection area for sensing near +X, near −X, near +Y, and near −Y movements of the shaft 12. The apertures 70-73 form an outer circular light collection area for sensing far +X, far −X, far +Y, and far −Y movements of the shaft 12.

Figure 5:
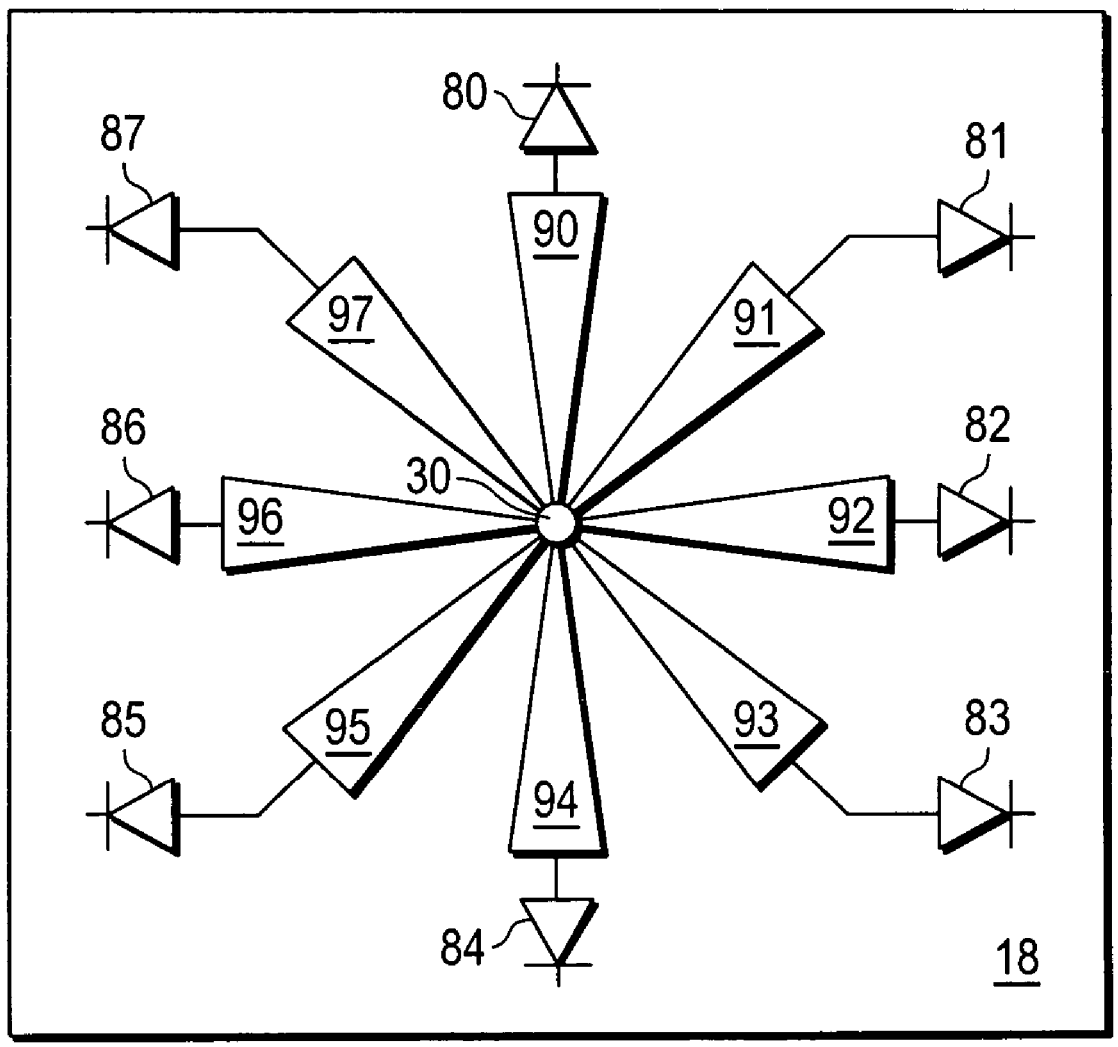
FIG. 5 shows a top view of another embodiment of a directional input device according to the present teachings.

FIG. 5 shows a top view of another embodiment of the directional input device 10. In this embodiment, the sensor surface 18 includes a set of light sensing elements 80-87 that are positioned to detect down, lower left, left, upper left, up, upper right, right, and lower right movements, respectively, of the shaft 12. The light sensing elements 80-87 have respective apertures 90-97 for receiving light reflected from the light emitter 30. Each aperture 90-97 has a sector shape with a variable width so that it accepts more light at its far end away from a center position of the light emitter 30 in comparison to the amount of light it accepts at its end near the center position. Each aperture 90-97 even at its widest is selected to be narrower than the width of the light beam reflected from the light emitter 30. An illumination of the wide end of each aperture 90-97 yields a larger sensor signal than illumination if its narrow end. As a consequence, the magnitude of a sensor signal yielded by each light sensing element 80-87 indicates a relative position, i.e. near or far, of a light beam along its The foregoing detailed description of the present invention is provided for the purposes of illustration and is not intended to be exhaustive or to limit the invention to the precise embodiment disclosed. Accordingly, the scope of the present invention is defined by the appended claims.

What is claimed is:

1. A directional input device, comprising:
 a light emitter;
 a shaft comprising a reflecting surface to reflect light from the light emitter;
 a set of light sensing elements positioned to sense light reflected from the reflecting surface of the shaft and to detect a tilt position of the shaft with respect to x and y axes based on signal states of the light sensing elements; and
 a set of apertures corresponding to the light sensing elements to receive light reflected from the reflecting surface of the shaft, wherein the apertures form a circular light collection area with an inner circular light collection area and an outer circular light collection area.

2. The directional input device of claim 1, wherein the light sensing elements are positioned to detect a set of predetermined positions of the shaft.

3. The directional input device of claim 1, wherein the light sensing elements are positioned to detect a set of near directional movements of the shaft and a set of far directional movements of the shaft.

4. The directional input device of claim 3, wherein the far directional movements correspond to a set of accelerate positions of the shaft.

5. The directional input device of claim 1, wherein each of the apertures has a pie shape.

6. The directional input device of claim 1, wherein the outer circular light collection area corresponds to a set of accelerate positions of the shaft.

7. The directional input device of claim 1, wherein each of the apertures has a sector shape that radiates from the light emitter.

8. The directional input device of claim 7, wherein each aperture is narrower near the light emitter.

9. The directional input device of claim 8, wherein a widest portion of each aperture is selected to be narrower than a light beam reflected from the light emitter.

10. A method for providing directional input, comprising:
   emitting light from a light emitter;
   reflecting the light at a reflecting surface of a shaft, wherein the shaft is configured to perform a tilting movement in response to manipulation of the shaft by a user;
   receiving reflected light at a set of apertures, the reflected light reflected from the reflecting surface of the shaft;
   detecting a tilt position of the shaft with respect to x and y axes by sensing light reflected from the reflecting surface of the shaft through at least one of the apertures, wherein sensing light comprises positioning a set of light sensing elements to detect a set of near directional movements of the shaft and a set of far directional movements of the shaft; and
   positioning the apertures relative to the light sensing elements, wherein the apertures form an inner circular light collection area and an outer circular light collection area.

11. The method of claim 10, wherein sensing light comprises positioning a set of light sensing elements to detect a set of predetermined positions of the shaft.

12. The method of claim 10, wherein sensing light comprises positioning a set of light sensing elements to form a circular light collection area.

13. The method of claim 10, wherein sensing light comprises positioning a set of light sensing elements to form an inner circular light collection area and an outer circular light collection area.

14. The method of claim 10, wherein sensing light comprises positioning the apertures relative to a set of light sensing elements, wherein each aperture forms a sector shape for receiving the light reflected from the reflecting surface of the shaft.

15. The method of claim 14, further comprising selecting a maximum width of the sector shape to be less than a width of a light beam reflected from the reflecting surface of the shaft.

16. A method for providing directional input, comprising:
   emitting light from a light emitter;
   reflecting the light at a reflecting surface of a shaft, wherein the shaft is configured to perform a tilting movement in response to manipulation of the shaft by a user;
   receiving reflected light at a set of apertures, the reflected light reflected from the reflecting surface of the shaft;
   detecting a tilt position of the shaft with respect to x and y axes by sensing light reflected from the reflecting surface of the shaft through at least one of the apertures, wherein sensing light comprises positioning a set of light sensing elements to form an inner circular light collection area and an outer circular light collection area; and
   positioning the apertures relative to the light sensing elements in the inner circular light collection area and the outer circular light collection area.

17. The method of claim 16, wherein sensing light comprises positioning a set of light sensing elements to detect a set of near directional movements of the shaft and a set of far directional movements of the shaft.

18. The method of claim 16, wherein sensing light comprises positioning the apertures relative to a set of light sensing elements, wherein each aperture forms a sector shape for receiving the light reflected from the reflecting surface of the shaft.

19. The method of claim 18, further comprising selecting a maximum width of the sector shape to be less than a width of a light beam reflected from the reflecting surface of the shaft.

* * * * *